United States Patent [19]
Gindrup et al.

[11] 3,819,564
[45] June 25, 1974

[54] RAPID CURING POWDERED COATING COMPOSITION

[75] Inventors: Wayne Gindrup; Alfred J. Siegmund, Jr., both of Houston, Tex.

[73] Assignee: Napko Corporation, Houston, Tex.

[22] Filed: Nov. 21, 1972

[21] Appl. No.: 308,536

[52] U.S. Cl. ...... 260/37 EP, 260/47 EC, 260/47 EA
[51] Int. Cl. ............................................. C08g 51/04
[58] Field of Search ........ 260/37 EP, 47 EC, 47 EA

[56] References Cited
UNITED STATES PATENTS 3,012,979  12/1961  Stephens et al. ........... 260/47 EA X
3,400,098  9/1968  Parry .......................... 260/47 EA X

*Primary Examiner*—Lewis T. Jacobs
*Attorney, Agent, or Firm*—James P. Dowd

[57]  ABSTRACT

Powdered epoxy coatings capable of rapid cure and flexibility are obtained by adding hydroxy pyridines to epoxy powder coatings hardened with aromatic anhydrides.

Even faster cures can be obtained if the epoxy resin is prebranched with aromatic amines. Better cathodic protection under-cutting resistance is achieved by adding small amounts of 2,3-Epoxy-1-propanol to the prebranched epoxy resin.

14 Claims, No Drawings

RAPID CURING POWDERED COATING COMPOSITION

BACKGROUND OF THE INVENTION

Powdered coatings have come into wide usage in recent years, particularly for coating steel pipes which are to be buried underground. These coatings consist of powdered epoxy resins intimately mixed with powdered hardeners and powdered accelerators. These coatings are generally applied to carefully cleaned steel pipe by means of electrostatic spraying or by dipping the pipe into a fluidized bed of the powdered coating. They are then baked. This causes the powder to fuse and simultaneously thermoset.

It is necessary that these powder coatings should cure rapidly and have resistance to underfilm creep when subjected to cathodic protection.

Cure is measured by bending a coated panel over a mandrel and then testing for cracks by attempting to pass a high voltage electric current through the portions of the coating deformed by the bend. The baking time necessary before the coating can be bent is a measure of the cure. Heretofore, coatings capable of curing in less than 2 minutes at 400° F. have been found to undercut severly when subjected to cathodic protection. Pipes are often subjected to a supplemental electrical protection called cathodic protection after burial in the ground. The pipe is connected to the negative terminal of a direct current voltage source. The positive terminal is generally buried in the soil in close proximity to the pipe. It is important that the coating should not lose adhesion when subjected to these conditions.

It is an object of this invention to provide a coating which will cure rapidly and possess good flexibility.

It is a further object of this invention to provide a coating which will be resistant to undercutting when subjected to cathodic protection.

SUMMARY OF THE INVENTION

This invention relates to improved powdered epoxy coating compositions of the type comprising a finely divided epoxy powder hardened with an aromatic anhydride.

It has been found that powders possessing very rapid curing properties are produced when accelerated with 3-hydroxy pyridine or 4-hydroxy pyridine. It has been further found that even faster cures can be achieved if the epoxy resin is a branched polymer. This branching is accomplished by heating a 1,2 epoxy resin with small amounts of aromatic amines. It has also been found that the incorporation of 2,3 epoxy-1-propanol into the branched resin of this invention can improve the resistance to cathodic disbonding.

DETAILED DESCRIPTION

Both 3-hydroxy pyridine and 4-hydroxy pyridine are solids at room temperature which is advantageous when formulating powdered coatings.

The addition of between 0.2% and 20% of hydroxypyridine to a 1,2 epoxy resin powder will accelerate the cure of an epoxy resin powder hardened with trimellitic anhydride by 16 fold. Unexpectedly we have found that coating containing the hydroxypyridines of this invention will pass a 60° bend over an 8 inch mandrel after being applied to a sandblasted steel panel and baked 45 seconds at 400° F. Whereas coating compositions hardened with trimellitic anhydride alone take 12 minutes at 400°F. to pass this test.

The accelerators of this invention are 3-hydroxy pyridine and 4-hydroxy pyridine

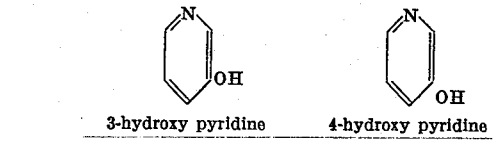

While not wishing to be bound by theory, it appears that these compounds catalyze the reaction of epoxides with carboxyls by a concerted push-pull mechanism occurring in a transient nine membered ring. The hydroxy pyridines seems to be a true bifunctional catalyst as it contains one nucleophilic and one electrophilic group, or one base and one acid group.

The rapid speed of cure obtainable when the hydroxypyridines are used to accelerate the carboxyl-epoxide reaction appears to result partially from the ability of hydroxypyridines to form loose Lewis salts with the epoxide and the carboxyl thus bringing them together in an electrically neutral but partially ionized and reactive form. 3-hydroxy pyridine is the preferred accelerator because it seems to possess the best stearic configuration to bring the partially ionized reactants close together, thus promoting their reaction. After reaction, 3-hydroxypyridine is left as an internal zwitterion which quickly rearranges to 3-hydroxy pyridine.

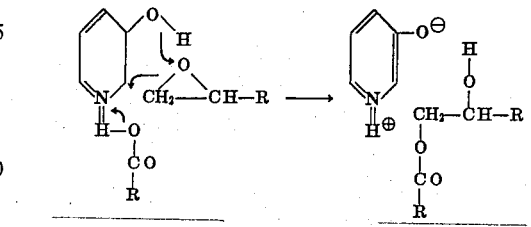

The epoxys of this invention comprise those polymers having at least two 1,2 epoxy groups per molecule. These resins should be pulverizable solids at room temperature. The preferred resin of this invention are polymers of bisphenol A and epichlorohydrin having melting points higher than 70° C.

For the purposes of this invention it is advantageous to prepare these resins by reacting a liquid diglycidyl ether with bisphenol A, using a terriary amine catalyst. This allows tailoring of resins to achieve desired results.

EXAMPLE I

This example illustrates the use of 3-hydroxypryridine in an epoxy powder coating hardened with trimellitic anhydride:

grams 2000 epoxy resin epoxide equivalent between 875 and 975, softening point of 95°–105° C by the Durran method 160.0 Trimellitic anhydride 10.0 3-hydroxypyridine 2.5 polylauryl acrylate All ingredients were charged into a 2 gallon pebble mill half filled with porcelain balls. The mill was rotated for 17 hours. The mill was emptied. The resultant powder was fluidized with air and a 3/10 inch thick sandblasted steel panel previously heated to 400° F. was immersed in the powder. The coated panel was baked for 45 seconds at 400° F and immediately cooled by dipping into cold water. After cooling, it was determined that the panel could be bent over a 6 inch cylindrical mandrel without cracking.

EXAMPLE II

This example illustrates the use of lower concentrations of 3-hydroxypyridine to achieve substantially the same degree of cure with a longer bake cycle.

2000 grams 1,2 epoxy resin (Durran softening point 100° C - epoxide equivalent 1000)
160 grams trimellitic anhydride
5.0 grams 3-hydroxypyridine
50 grams chromium oxide
2.5 grams polylauryl acrylate This coating was able to pass the 60° bend test of Example I after baking 120 seconds at 400° F.

EXAMPLE III 4-hydroxypyridine can be used to obtain adequate cures.

However, a greater concentration must be used:
grams
2000 1,2 epoxy resin (epoxide equivalent 900, Durran softening point 100° C)
170 trimellitic anhydride
10 4-hydroxypyridine
50 iron oxide
2.5 polylaurylacrylate flow control agent This powder was prepared and tested the same way as the powder of Example I. It was found that this powder would pass the bend test after a 2 minute bake at 400° F.

The speed of cure can be further accelerated by substituting a prebranched epoxy resin in place of the conventional linear resins of commerce.

Prebranching is accomplished by heating an aromatic diamine with a 1,2 epoxy resin. The branched resin of this invention should not be confused with adducts which are fully described by the prior art.

Branched resins prepared according to this invention are permanently thermoplastic even at elevated temperatures and are essentially insoluble in acetone.

The amount of aromatic diamine useful in preparing the branched resins of this invention should not exceed 0.3 mols for every 4 mols of 1,2 epoxy resin.

The amines useful in preparing this invention are aromatic diamines having at least two primary or secondary nitrogen atoms that are directly attached to an aromatic ring and at least three active hydrogen atoms.

Examples of amines useful in this invention are: 4,4 methylene dianiline, diaminodiphenyl sulfone, 3,4 toluene diamine, oxydianiline and metaphenylenediamine.

The epoxy resin, together with the amine, is heated to about 400° F. There is generally a slight exotherm commencing at 350° F.

EXAMPLE IV grams
2200 1,2 epoxy resin epoxide equivalent between 875–975
30 methylene dianiline The epoxy resin was heated to 400°F. in a 1 gallon container equipped with a mechanical stirrer.

The methylene dianiline was then added. The mixture exothermed to 420° F. The temperature was held at 420° F. for 15 minutes. It was then allowed to cool.

It was then mixed with 160 grams of trimellitic anhydride and 10 grams of 3-hydroxypyridine. The mixture was reduced to a fine powder by grinding overnight in a porcelain ball mill.

The powdered coating was then applied to a sandblasted steel panel by means of electrostatic spray. The coated panel was then baked 45 seconds at 400° F. The cooling was tested for completeness of cure by bending the panel over a 6 inch mandrel. No cracking of the coating was observed. The coating was found to be free of microscopic cracks when subjected to a voltage test of 1,000 volts.

EXAMPLE V

This example illustrates the preparation of a brached resin with p-aminophenyl sulfone, 2400 grams of an epoxy resin having an epoxide equivalent of 600–700 and a Durran softening point of 75°–85° C was heated to 350° F. 72 grams of p-aminophenyl sulfone was added over a 15 minute period. The resin was allowed to cool, mixed with 200 grams of trimellitic anhydride and 15 grams of 3-hydroxypyridine. It was ground to a fine powder and applied to a sandblasted steel panel. It was found that this coating, when tested as in Example I, would pass the 60° bend test after baking 42 seconds at 415° F.

The resistance of the powder coatings of this invention to cathodic protection tests can be improved by the incorporation of 2-3 epoxy-1-propanol into the branched polymer. The following example illustrates the preparation of a 2-3-epoxy-1-propanol into a branched polymer. In this example a liquid epoxy resin is first advanced to a solid resin of higher molecular weight by heating with bisphenol A and tributyl amine.

EXAMPLE VI 1610 grams of the diglycidal ether of bisphenol A was charged into a one gallon tinned steel container fitted with a power agitator. 690 grams of p,p bisphenol "A" was stirred in, followed by 5 ml. of tri-n-butyl amine. The mixture was heated to 250° C. The heat was cut. The mixture exothermed to 385° F. over a 22 minute period. It was allowed to cool to 400°F. and held there for 15 minutes. 16.0 milliters of 2,3 epoxy-1-propanol was added, followed by 30 grams of methylene dianiline. The mixture exothermed to 420° F. The temperature was maintained at 400° F. for 5 minutes. The molten resin was then dumped onto a tinned steel sheet and allowed to cool. The resulting brittle transparent yellow resin was then crushed into pea size particles.

EXAMPLE VII

This resin illustrates the preparation of a pigmented epoxy pipe coating:
2000 grams branched resin of Example VI
160 grams trimellitic anhydride
50 grams red iron oxide
10 grams 3-hydroxy pyridine
15 grams finely divided silica The above ingredients were charged into a 2 gallon ball mill and ground overnight. The powder was discharged into a fluid bed apparatus and fluidized. A sandblasted steel panel previously heated to 450° F. was dipped into the bed. The coated panel was then transferred to a 450° F. oven and baked 45 seconds.

The gloss of the coating was found to be 40. The coated panel could be bent 60° without cracking. No pinholes could be detected when tested at 1000 volts.

We claim:

1. A powdered coating composition containing a polyglycidal ether of bisphenol A, having as a hardener trimellitic anhydride wherein the improvement comprises an accelerator selected from the group consisting of 3-hydroxypyridene, and 4-hydroxypyridine.

2. The coating composition of claim 1 wherein the accelerator is 3-hydroxypyridine.

3. A powdered coating composition comprising a blend of:
   1. A hardener consisting of trimellitic anhydride,
   2. An accelerator selected from the group consisting of 3-hydroxypyridine and 4-hydroxypyridine,
   3. an epoxy polymer which is the reaction product of:
      a. a polyglycidal ether of bisphenol A having an epoxide equivalent between 500 and 2000,
      b. an aromatic diamine that includes at least two groups selected from primary and secondary nitrogen atoms that are directly attached to an aromatic ring and that carry a combined total of at least three active hydrogen atoms, said aromatic diamine being present in a concentration not to exceed 0.3 mols for every 4 mols of the polyglycidal ether of bisphenol A.

4. The powdered coating composition of claim 3 wherein the accelerator consists of 3-hydroxy pyridine.

5. The coating composition of claim 3 wherein the polyglycidal ether of bisphenol A has a Durran softening point of 95°–105° C., an epoxide equivalent of 870–1000 said resin being the reaction product of bisphenol A and epichlorohydrin.

6. A powdered coating composition comprising a blend of (1) a hardener consisting of trimellitic anhydride (2) an accelerator selected from the group consisting of 3-hydroxypyridine, and 4-hydroxypyridine (3) a polyglycidal ether of bisphenol A having an epoxide equivalent of between 500 and 2000 and a melting point greater than 65° C.

7. The powdered coating composition of claim 6 wherein the accelerator is 3-hydroxy pyridine.

8. The powdered coating composition of claim 6 wherein the 1,2 epoxy resin has an epoxide equivalent between 870 and 1000 and a softening point between 95°–105° C. said resin being a copolymer of bisphenol A and epichlorohydrin.

9. A powdered coating composition comprising a blend of (1) between 1% and 20% of a hardener consisting of trimellitic anhydride, (2) between 0.1% and 20% of an accelerator selected from the group consisting of 4-hydroxy pyridine, 3-hydroxypyridine, (3) a thermoplastic polymer which is the reaction product of:
   a. a polyglycidal ether of bisphenol A having an epoxide equivalent between 500 and 2000 and a melting point greater than 65° C. by the Durran method,
   b. an aromatic diamine that includes at least 2 groups selected from primary and secondary nitrogen atoms that are directly attached to an aromatic ring and that carry a combined total of at least three active hydrogen atoms said diamine being present in a concentration of not to exceed 0.3 mols for every 4 mols of the polyglycidal ether of bisphenol A.
   c. between 0.01% to 3% of 2,3 epoxy-1-propanol.

10. The powdered coating composition of claim 9 wherein the accelerator is 3-hydroxypyridine.

11. The powdered coating composition of claim 9 wherein the aromatic diamine is p,p'-diaminodiphenylenemethane.

12. The coating composition of claim 9 wherein the polyglycidal ether of bisphenol A has a softening point of 95 to 105° C., an epoxide equivalent between 870 and 1000, said resin being the reaction product of bisphenol A and epichlorohydrin.

13. A powdered coating composition according to claim 9 wherein there is up to 6% of iron oxide.

14. The powdered coating of claim 1 containing up to 12% powdered silica.

* * * * *